United States Patent
Tombs et al.

(10) Patent No.: US 8,401,416 B2
(45) Date of Patent: Mar. 19, 2013

(54) ELECTROPHOTOGRAPHICALLY PRINTING JOB HAVING JOB TYPE

(75) Inventors: Thomas N. Tombs, Rochester, NY (US); Hwai-Tzuu Tai, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 303 days.

(21) Appl. No.: 12/942,420

(22) Filed: Nov. 9, 2010

(65) Prior Publication Data
US 2012/0114362 A1 May 10, 2012

(51) Int. Cl.
*G03G 15/00* (2006.01)

(52) U.S. Cl. .......................................................... 399/85

(58) Field of Classification Search ............... 399/45, 399/82, 85
See application file for complete search history.

(56) References Cited

U.S. PATENT DOCUMENTS

| | | | |
|---|---|---|---|
| 5,704,021 A | 12/1997 | Smith et al. | |
| 5,734,800 A | 3/1998 | Herbert et al. | |
| 6,542,173 B1 | 4/2003 | Buckley | |
| 6,608,641 B1 | 8/2003 | Alexandrovich et al. | |
| 7,450,269 B2 | 11/2008 | Tai et al. | |
| 7,970,300 B2 * | 6/2011 | Tabata et al. | 399/45 |
| 8,086,161 B2 * | 12/2011 | Omata | 399/341 |
| 8,154,765 B2 * | 4/2012 | Purdum et al. | 358/1.9 |
| 2006/0114481 A1 | 6/2006 | Moore | |
| 2006/0133870 A1 | 6/2006 | Ng et al. | |
| 2008/0159786 A1 | 7/2008 | Tombs et al. | |

* cited by examiner

*Primary Examiner* — David Gray
*Assistant Examiner* — Gregory H Curran
(74) *Attorney, Agent, or Firm* — Christopher J. White

(57) ABSTRACT

A method of printing a job having a type using an electrophotographic (EP) printer includes receiving the job and its type. A processor is used to automatically select a first or a second job mode based on the job type; the first job mode indicates aggressive gray component replacement (aGCR) is used but not clear toner, and the second job mode indicates clear toner is used but not aGCR. The data of the job are processed using the processor according to the selected job mode to provide six separations corresponding to respective colorants. Toner corresponding to the six separations is then applied to the receiver using at least one EP printing module in the EP printer to produce a print image of the job.

14 Claims, 6 Drawing Sheets

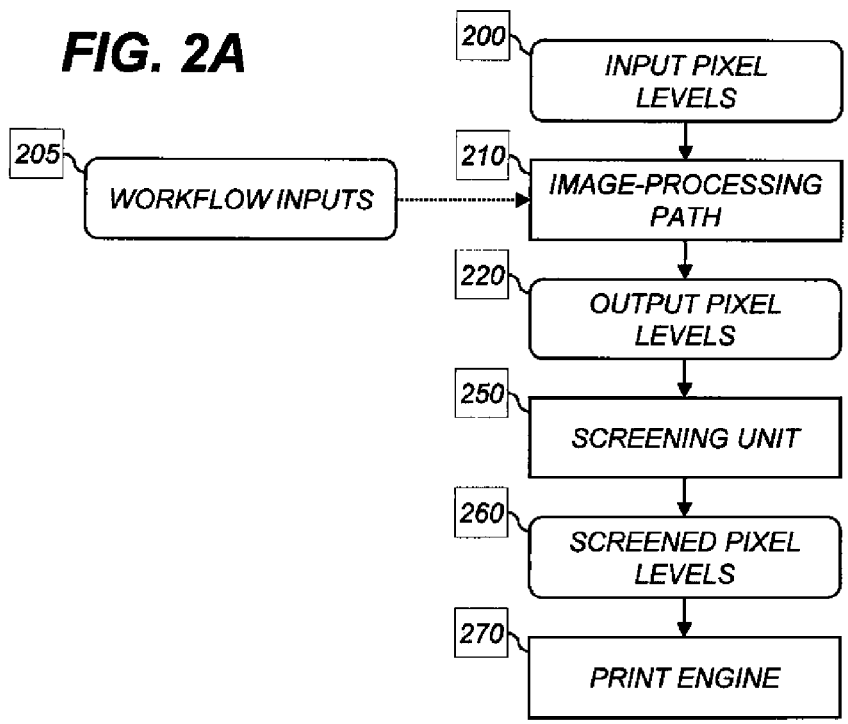
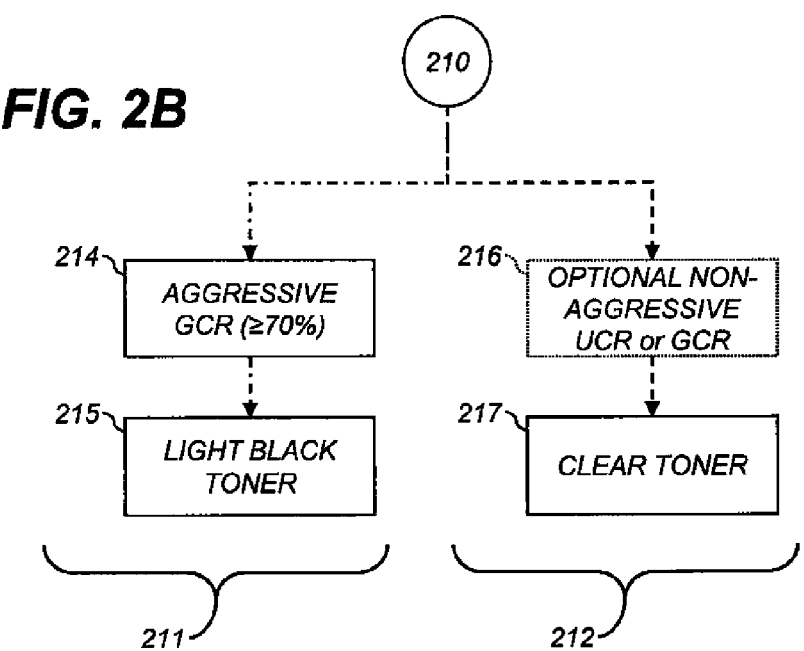

FIG. 6

FIRST JOB MODE: AGCR

| | R | G | B | L* | a* | b* | BEFORE AGCR C M Y K | | | | AFTER AGCR C M Y K | | | | AFTER LIGHT-BLACK PROCESSING C M Y K LK Clear | | | | | |
|---|---|---|---|---|---|---|---|---|---|---|---|---|---|---|---|---|---|---|---|
| BLACK | 0 | 0 | 0 | 0 | 0 | 0 | 100 | 100 | 100 | 0 | 75 | 71 | 75 | 100 | 68 | 52 | 42 | 100 | 30 | 0 |
| DK. GRAY | 100 | 100 | 100 | 42.38 | 0.01 | -0.002 | 61 | 61 | 61 | 0 | 19 | 14 | 6 | 50 | 19 | 14 | 6 | 21 | 88 | 0 |
| LT. GRAY | 200 | 200 | 200 | 80.6 | 0.012 | -0.003 | 22 | 22 | 22 | 0 | 5 | 4 | 2 | 15 | 5 | 4 | 2 | 0 | 35 | 0 |
| WHITE | 255 | 255 | 255 | 100 | 0.021 | -0.006 | 0 | 0 | 0 | 0 | 0 | 0 | 0 | 0 | 0 | 0 | 0 | 0 | 0 | 0 |

SECOND JOB MODE: CLEAR

| | R | G | B | L* | a* | b* | BEFORE UCR C M Y K | | | | AFTER UCR C M Y K | | | | WITH LARGE-PARTICLE CLEAR C M Y K LK Clear | | | | | |
|---|---|---|---|---|---|---|---|---|---|---|---|---|---|---|---|---|---|---|---|
| BLACK | 0 | 0 | 0 | 0 | 0 | 0 | 100 | 100 | 100 | 0 | 75 | 71 | 75 | 100 | 75 | 71 | 75 | 100 | 0 | 0 |
| DK. GRAY | 100 | 100 | 100 | 42.38 | 0.01 | -0.002 | 61 | 61 | 61 | 0 | 53 | 44 | 48 | 16 | 53 | 44 | 48 | 16 | 0 | 20 |
| LT. GRAY | 200 | 200 | 200 | 80.6 | 0.012 | -0.003 | 22 | 22 | 22 | 0 | 18 | 16 | 12 | 0 | 18 | 16 | 12 | 0 | 0 | 50 |
| WHITE | 255 | 255 | 255 | 100 | 0.021 | -0.006 | 0 | 0 | 0 | 0 | 0 | 0 | 0 | 0 | 0 | 0 | 0 | 0 | 0 | 70 |

ELECTROPHOTOGRAPHICALLY PRINTING JOB HAVING JOB TYPE

FIELD OF THE INVENTION

This invention pertains to the field of printing and more particularly to improving image quality of various types of printed images.

BACKGROUND OF THE INVENTION

Printers are useful for producing printed images of a wide range of types. Printers print on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Various schemes can be used to process images to be printed.

For example, U.S. Publication No. 2008/0159786 by Tombs et al., entitled "Selective printing of raised information by electrography," published Jul. 3, 2008, the disclosure of which is incorporated herein by reference, describes electrophotographic printing using marking particles of a substantially larger size than the standard size marking particles of the desired print image. Tombs et al. also describe using non-pigmented ("clear") marking particles to overlay raised information on an image. This technique is very useful. However, not all jobs need raised information printed.

U.S. Pat. No. 5,111,302 to Chan et al., entitled "Method and system for enhancing the quality of both color and black and white images produced by ink jet and electrophotographic printers," issued May 5, 1992, the disclosure of which is incorporated herein by reference, describes an embodiment of undercolor removal (UCR). This technique reduces the amount of toner consumed in printing near-neutrals by replacing black density formed with cyan, magenta, and yellow colorants with black colorant. The amount of UCR is specified using a percentage of the black density from the Y, M, and C to be replaced with K. However, this UCR method can reduce maximum density and thus degrade image quality.

U.S. Pat. No. 5,734,800 to Herbert et al., entitled "Six-color process system," issued Mar. 31, 1998, the disclosure of which is incorporated herein by reference, describes UCR and gray component replacement (GCR). In GCR, black is used to replace a portion of the complementary toner to the color to be reproduced (e.g., with 100% GCR, red colors are made with Y, M, and K instead of Y, M, and C). The amount of GCR is specified using a percentage of the complementary toner to be replaced by black. Typical GCR percentages are from 30-50%. However, various schemes for performing GCR can result in more black toner being added to lower-density regions of the tonescale than desirable, resulting in reduced image quality.

A print job, i.e., a set of job data to be reproduced onto one or more pages of output, can include multiple types of content. An example of a job is a page of a newspaper, which contains text, halftoned photographs, and line-art or other graphics. Various techniques are used to process different content types within a single job, and any given printer is generally designed to produce higher-quality output for some types of content than for others.

For example, U.S. Publication No. 2006/0114481 by Moore, entitled "Object-oriented ink selection," published Jun. 1, 2006, describes processing print job data based on objects identified in the job. For example, a block of text is an object and a photographic image is a different type of object. For each object, a black colorant selection is made among matte and gloss finish single component black colorant formulations based on determined object type. For example, text is printed with matte black, and photographs are printed with glossy black.

U.S. Pat. No. 5,704,021 to Smith et al., entitled "Adaptive Color Rendering By An Inkjet Printer Based On Object Type," issued Dec. 30, 1997, likewise describes changing the halftone or color matching of an object in a job depending on the type of job.

However, these systems are only concerned with the appearance of individual objects and not with the overall quality or viewer impression of the printed job. Moreover, this scheme does not take into account the characteristics of the receiver on which the image will be printed, or of the type of job (e.g., 4"×6" photograph) being printed.

U.S. Pat. No. 6,542,173 to Buckley, entitled "Systems, Methods And Graphical User Interfaces For Printing Object Optimized Images Based On Document Type," issued Apr. 1, 2003, describes identifying a job with the predominant object type in that job. All objects in that job can be rendered according to the identified predominant type, or two or more sets of rendering parameter options can be applied to different types of objects of a document, based on the identified document type. However, rendering all objects with a single type produces lower-quality renderings of objects that are not actually that type. Changing rendering parameter options based on the object type and the page type still does not take into account the appearance of the whole page.

SUMMARY OF THE INVENTION

Moreover, none of the above-described schemes take into account the desire to maintain image quality while controlling toner usage. Using less-dense toners, such as a light-black toner (referred to herein as Lk), can improve image quality by providing more-stable dots and finer tonescale resolution in the midtone and highlight areas of images. Using clear toners can improve image quality by reducing image relief artifacts with an inverse mask and providing a desired surface gloss. Although light toners and clear toners can be used together, doing so increases toner usage compared to using one or the other. There is therefore a continuing need for determining toner laydown to improve image quality of prints while controlling toner usage, and for ways of providing high-quality images of very different types of content from a single printer, e.g., a minilab or kiosk in a retail setting.

According to an aspect of the present invention, there is provided a method of printing a job having a type using an electrophotographic (EP) printer, comprising:

receiving the job and its type;

automatically selecting, using a processor, a first or a second job mode based on the job type, wherein the first job mode indicates aggressive gray component replacement (aGCR) is used but not clear toner, and the second job mode indicates clear toner is used but not aGCR;

processing the data of the job using the processor according to the selected job mode to provide six separations corresponding to respective colorants; and applying toner corresponding to the six separations to the receiver using at least one EP printing module in the EP printer to produce a print image of the job.

According to another aspect of the present invention, there is provided a method of printing a job having a type using an electrophotographic (EP) printer, comprising:

receiving the job and its type;

automatically selecting, using a processor, a first or a second job mode based on the job type, wherein the first job mode indicates aggressive gray component replacement (aGCR) is used but not clear toner, and the second job mode indicates clear toner is used but not aGCR;

processing the data of the job using the processor according to the selected job mode to provide five separations corresponding to cyan, magenta, yellow, black, and clear toner, respectively; and applying toner corresponding to the five separations to the receiver using at least one EP printing module in the EP printer to produce a print image of the job.

An advantage of this invention is that it can reduce total toner usage without degrading image quality by substituting light black toner for some of the normal black toner. In the first job mode, using light black toner and aggressive GCR improves image quality without substantially increasing the total toner usage of CMYKLk. In the second job mode, because aggressive GCR is not used, the black toner will not be used, or will be used to a lesser extent (due to UCR or non-aggressive GCR) in the highlight to midtone areas of the image, advantageously maintaining high image quality. Applying clear toner in this mode further enhances image quality. Selecting the first job mode for some jobs and the second job mode for others provides high-quality images at reasonable cost in toner usage for a variety of job types.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2A is a schematic of a data-processing path useful with the present invention;

FIG. 2B shows details of part of an embodiment of the image-processing path shown in FIG. 2A;

FIG. 6 is an example of patches processed according to the two subpaths shown in FIG. 2B.

Figure 1:
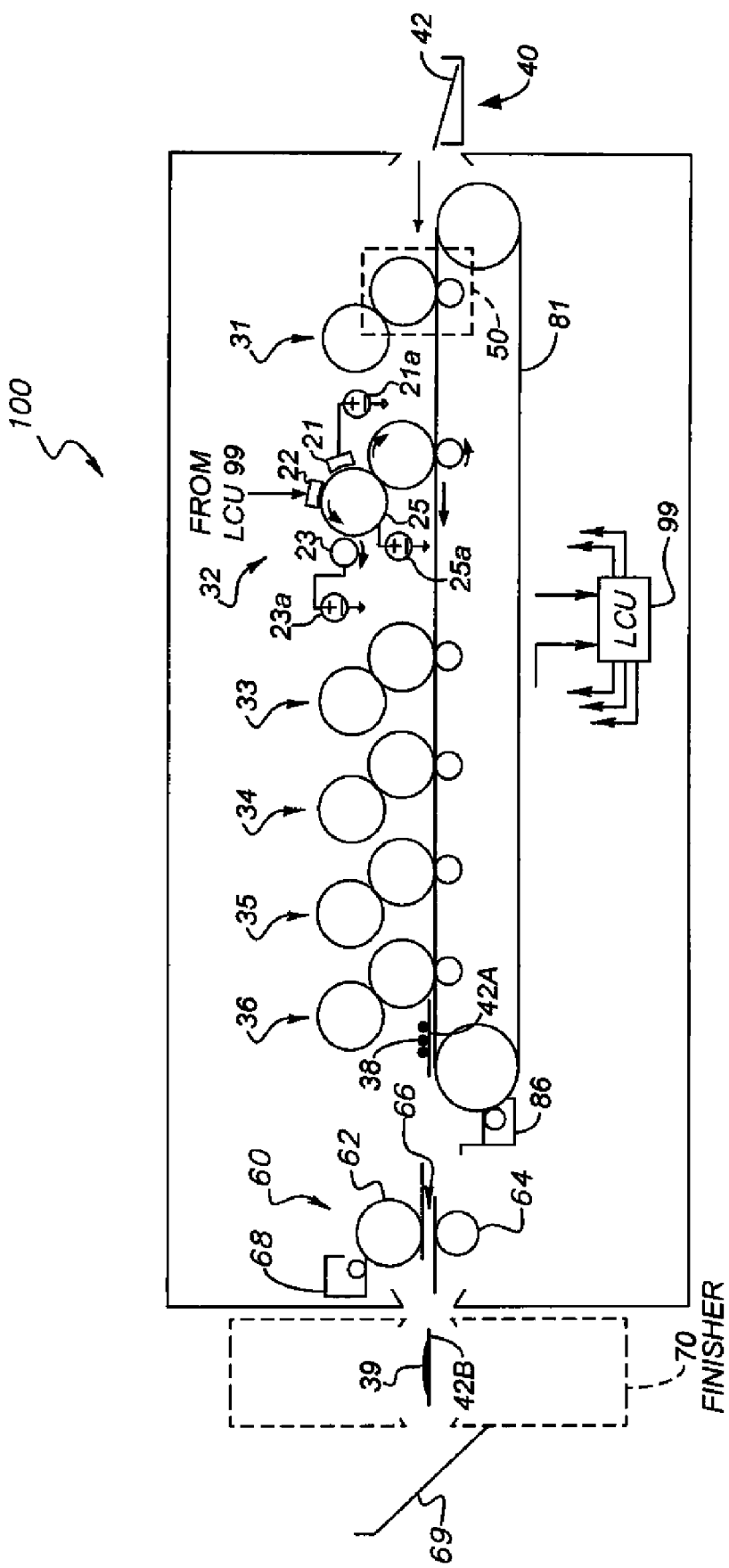
FIG. 1 is an elevational cross-section of an electrophotographic reproduction apparatus suitable for use with this invention.

The attached drawings are for purposes of illustration and are not necessarily to scale.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein, are selected from such systems, algorithms, components, and elements known in the art. Given the system as described according to the invention in the following, software not specifically shown, suggested, or described herein that is useful for implementation of the invention is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The electrophotographic (EP) printing process can be embodied in devices including printers, copiers, scanners, and facsimiles, and analog or digital devices, all of which are referred to herein as "printers." Various aspects of the present invention are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with the present invention, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

FIG. 1 is an elevational cross-section showing portions of a typical electrophotographic printer 100 useful with the present invention. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. One embodiment of the invention involves printing using an electrophotographic print engine having six sets of single-color image-producing or—printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on the photoreceptor, a suitable receiver is brought into juxtaposition with the visible image. In transfer station 50, a suitable electric field is applied to transfer the toner particles of the visible image to the receiver to form the desired print image on the receiver. The imaging process is typically repeated many times with reusable photoreceptors.

The receiver is then removed from its operative association with the photoreceptor and subjected to heat or pressure to permanently fix ("fuse") the print image to the receiver. Plural print images, e.g. of separations of different colors, are overlaid on one receiver before fusing to form a multi-color print image on the receiver.

Each receiver, during a single pass through the six modules, can have transferred in registration thereto up to six single-color toner images to form a pentachrome image. As used herein, the term "hexachrome" implies that in a print image, combinations of various of the six colors are combined to form other colors on the receiver at various locations on the receiver. That is, each of the six colors of toner can be combined with toner of one or more of the other colors at a particular location on the receiver to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms a print image using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers to fuser 60, which fixes the toner particles to the respective receivers by the application of heat and pressure. The receivers are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed with the present invention. For example, solvent fixing uses solvents to soften the toner particles so they bond with the receiver. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver.

The receivers (e.g. receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver, i.e. to form a duplex print. Receivers can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. All of these parameters can be changed, as described below.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

FIG. 2A shows a data-processing path useful with the present invention, and defines several terms used herein. Printer 100 (FIG. 1) or corresponding electronics (e.g. the DFE or RIP), described herein, operate this datapath to produce image data corresponding to exposure to be applied to a photoreceptor, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 . . . 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. This conversion can be part of the color-management system discussed above. Output pixel level 220 can be linear or non-linear with respect to exposure, L*, or other factors known in the art.

Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards. Part of an embodiment of image-processing path 210 is shown in FIG. 2B, discussed below.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi≠oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multi-level halftone processing, and can include a screening memory or dither bitmaps. Screened pixel levels 260 are at the bit depth required by print engine 270.

Print engine 270 represents the subsystems in printer 100 that apply an amount of toner corresponding to the screened pixel levels to a receiver 42 (FIG. 1) at the respective screened pixel locations. Examples of these subsystems are described above with reference to FIGS. 1-3. The screened pixel levels and locations can be the engine pixel levels and locations, or additional processing can be performed to transform the screened pixel levels and locations into the engine pixel levels and locations.

FIG. 2B shows details of part of an embodiment of the image-processing path shown in FIG. 2A. The blocks shown herein operate on CMYKLkClear data. Image-processing path 210 includes two subpaths 211, 212, which are selected between as discussed below with reference to step 320 shown in FIG. 3. In subpath 211, units 214 and 215 are used to produce output pixel levels 220. In subpath 212, units 216 and 217 are used. Each job can use all four of CMYK, and each job uses one but not both of the Lk and Clear separations. Before discussing subpaths 211 and 212, UCR and GCR are discussed.

UCR (undercolor removal), and GCR (gray component replacement) are useful image-processing techniques in CMYK and CMYK+x systems. With UCR, any areas that are printed with yellow, magenta, and cyan are modified so that the neutral content from the CMY is replaced with black toner (K). UCR therefore is more significant for neutrals and near-neutrals than for more saturated colors. UCR is very useful in letterpress printing, because printing thick ink films of CMY on top of each other and applying pressure from the printing plate can result in a mottled, squashed look. Therefore, for letterpress printing, 100% UCR has generally been applied. This means that all of the Y=M=C density is replaced with K. This also reduces cost since black ink is less expensive than colored inks. However, for lithographic printing where much thinner ink films are printed, it is common practice to include CMY along with black to increase density and detail in the shadow areas. Without some Y, M, and C, the $D_{MAX}$ of the paper-toner combination cannot be achieved. Typically, 10-60% UCR is applied to lithographic printing. By comparison, with 0% UCR, equal amounts of CMY are removed, but the density is not replaced with black. This reduces density (L* increases), but does not affect h* or C*.

With GCR, one of the process colors in a 3-color (CMY) print that is closest to the complementary color of the color to be printed is replaced with black. For example, a dirty-looking red is made with CMY. In this case, the cyan is the complementary color to red. 100% GCR replaces cyan with black, so the red is made with YMK. 50% GCR replaces some of the cyan with black, so the red is made with Y, M, some C, and some K. This advantageously provides more consistent color, since variations in black density do not affect hue in the way that variations in cyan do. GCR is generally more significant in somewhat saturated colors than in near-neutrals. As with UCR, 100% GCR reduces maximum density, so <100% GCR, e.g., 30-50%, is generally applied.

A formula for an embodiment of both UCR and GCR, for dot percentages of C, M, and Y and percentage parameter P (i.e., P % UCR or P % GCR), producing C', M', Y', K', is:

$$K' = P \cdot \min(C, M, Y)$$

$$C' = C - \min(C, M, Y)$$

$$M' = M - \min(C, M, Y)$$

$$Y' = Y - \min(C, M, Y)$$

assuming that C, M, and Y are balanced so that equal percentages of C, M, and Y give a neutral (C*=0).

With GCR, fewer chromatic colors are used (and therefore less toner) than without GCR, reducing toner cost. With UCR, less chromatic toner is needed to create a neutral color, i.e., the toner coverage is reduced. This also reduces cost. GCR generally reduces toner usage to a greater extent than UCR.

UCR, GCR, or both can be performed during or after the color space transformation from RGB to CMYK. Further details of UCR and GCR are given in U.S. Pat. No. 7,450,269 to Tai et al., entitled "Gray level halftone processing," issued Nov. 11, 2008, and in the above-referenced '800 patent.

Still referring to FIG. 2B, in subpath 211, CMYK values are received by aggressive-GCR unit 214. Unit 214 performs aggressive GCR on the CMYK values; that is, it replaces at least 70%, or 70-90%, or 75% of the chromatic content of the color with black density. Unit 214 provides its outputs to light-black toner processing unit 215.

Unit 215 renders some of the black density in each color as normal black toner (K) and some as light black toner (Lk). That is, some of the black density in each color is processed to produce data in a black separation, and some is processed to produce data in a light black separation. For a particular job, e.g. an image of bright clouds, it can be the case that all of the black density is provided using light black toner. Subpath 211 produces data for K and Lk, even though K can be empty for such a job. This is not the same as subpath 212, in which the Lk separation is empty regardless of the content of the job. In an embodiment, unit 215 does this using a lookup table. The lookup table holds a composite of K and Lk tonescale curves in which a smooth tone response curve is created by blending K and Lk together. Lk is used in regions of the tonescale with relatively low dot coverage (low percents C, M, Y), increases as dot coverage percentage increases, and tapers off as dot coverage reaches the shadow area of the tonescale. Normal black (K) is added starting near the midtones (i.e., it starts at more dense colors than Lk starts at), and the amount of K increases as dot area increases, until eventually only K is used in the $D_{MAX}$ area.

When GCR above 50% is used in normal CMYK printers without light black toner, the image quality can suffer because K toners are used too early in the tone scale. Using Lk and K advantageously permits high-quality reproduction across the tonescale, even for aggressive GCR levels.

In subpath 212 of image-processing path 210, CMYK values are received by non-aggressive UCR or GCR unit 216, or directly by clear-toner processing unit 217. In embodiments in which unit 216 is used, non-aggressive UCR or GCR, e.g., with a parameter <70%, is performed on the CMYK values. Any black added in (which can be none if 0% GCR is performed) is normal black (K), not light black (Lk). Unit 216 provides its output to clear-toner processing unit 217.

Clear-toner processing unit 217 produces image data for a separation corresponding to clear toner. Clear toner can be applied for a variety of purposes, singly or in combination. When clear toner is used, non-aggressive UCR or GCR can be used to improve image quality and reduce the toner cost of the job.

Clear toner can be applied to level toner stack heights. For example, if a 100% cyan patch is adjacent to a 200% blue patch (100% cyan+100% magenta), the blue patch will be approximately twice as high as the cyan patch. If the clear toner particles and the colored toner particles have the same sizes, 100% clear toner can be applied on top of the cyan patch to make the height of the toner stack in the cyan patch the same or substantially the same as the height of the toner stack in the blue patch. This can reduce gloss differences and image-relief artifacts between adjacent colors. Clear toner is applied according to an inverse mask to obtain this result. That is, the toner height at each engine pixel is estimated, and the estimate subtracted from the desired toner height after applying clear (e.g., 320% or 400% for CMYK systems) to determine the desired toner height of clear toner. The desired clear heights are then mapped back to engine pixel levels for the clear separation. As clear-toner particle size increases, a lower percent coverage of clear toner is used to obtain the same stack height.

Clear toner can also be coated uniformly across a job or part of a job to produce a more uniform gloss or to make the print image more resistant to environmental influences such as staining when dripped on. Clear toner can also be coated image-wise to form patterns more visible at some angles than others, analogous to watermarks but on the surface of the media rather than embedded.

Both subpaths 211, 212 are not used to process the same job. As shown by the dashed and dot-dash arrows, a processing path including one or the other subpath, but not both, provides output pixel levels 220 (FIG. 2A) from input pixel levels 200 (FIG. 2A). Other processing, e.g., RGB-CMYK transformation as described above, can be performed in image-processing path 210 regardless of which subpath is being used for a particular job.

FIG. 6 is an example of patches processed according to subpaths 211, 212 (FIG. 2B). The patches are a black, a dark gray, a light gray, and a white. The top section, labeled "first job mode," shows RGB inputs in the sRGB color space, the corresponding CIELAB values according to CIE Pub. 15:2004, 3rd. ed., and the corresponding CMYK values (0-100%) before aggressive GCR. The CMYK values after aGCR (FIG. 2B, unit 214) are then shown, indicating, e.g., for the black patch, that 100% K is now being used, plus C, M, and Y to maintain the original density at a neutral color. The CMYKLkClear values after light-black processing (FIG. 2B, unit 215) show that some of the K has been moved to light black (here, LK). No clear is used.

The bottom section, labeled "second job mode," shows the RGB, CIELAB, and CMYK-before-UCR values as in the top section. However, non-aggressive 50% UCR was applied, resulting in the CMYK values shown. Large-particle clear is then added to level the stack heights, resulting in the CMYKLkClear values shown, where LK=0 (Lk is not used with clear).

Figure 3:
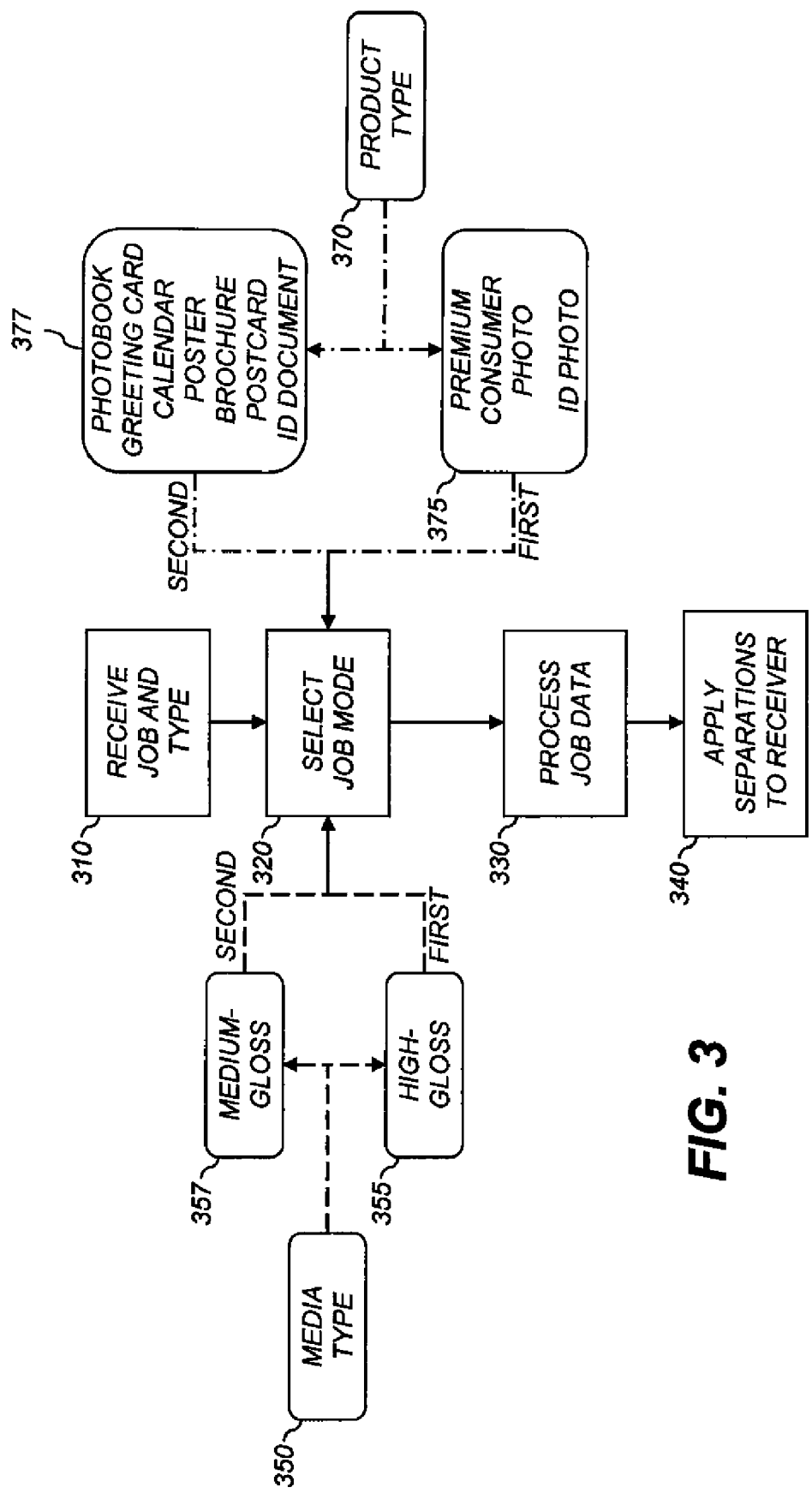
FIG. 3 is a flowchart of a method of printing a job according to an embodiment.

FIG. 3 is a flowchart of a method of printing a job having a type using an electrophotographic (EP) printer according to various embodiments. Processing begins with step 310.

In step 310, the job and its type are received. Job types will be discussed further below. Step 310 is followed by step 320.

In step 320, a processor is used to automatically select a first or a second job mode for the job based on the job type. The processor can be a CPU, GPU, FPGA, ASIC, PAL, PLD, microcontroller, or other device adapted to execute a software program or flow data through logic circuits to determine the job mode.

The first job mode indicates that aggressive gray component replacement (aGCR) is to be used for this job, but not clear toner (subpath 211, FIG. 2B). The second job mode indicates clear toner is to be used for this job, but not aGCR (subpath 212, FIG. 2B). In various embodiments, light-black toner (Lk) is used in the first job mode, but not in the second job mode. Therefore, in this embodiment the processor provides an empty separation corresponding to light black (Lk) for jobs in the second job mode. By "empty separation" it is meant that the separation does not call for any toner of the corresponding color to be deposited on the receiver. In the first job mode, the clear separation is empty. Step 320 is followed by step 330.

In step 330, the data of the job are processed using the processor according to the selected job mode (first or second) to provide six separations corresponding to respective colorants. Processing can be performed as described above with reference to FIGS. 2A-B. For jobs in the first job mode, subpath 211 (FIG. 2B; the dash-dot path) is used; for jobs in the second job mode, subpath 212 (FIG. 2B; the dashed path) is used. Step 330 is followed by step 340.

In step 340, toner corresponding to the six separations is applied to the receiver using at least one EP printing module in the EP printer to produce a print image of the job. There can be six printing modules, one for each separation, or a given printing module can apply more than one separation consecutively or sequentially to the receiver.

FIG. 3 shows two embodiments of job types; other job types can also be employed. In one embodiment (shown with dashed arrows), the job type is a media type indicating what kind of media the job is being printed on. Examples of media types include photographic and bond. In another embodiment (shown with dash-dot arrows), the job type is a product type. Examples of product types include 4"×6" photographic print, photobook, marketing flyer, and business letter.

In an embodiment (dashed), the job type is media type 350. The processor selects the first job mode (aGCR) for media types including high-gloss photo-media paper having a G60 gloss measurement greater than or equal to 60, represented graphically with box 355. The processor selects the second job mode (inverse masking) for media types including medium-gloss coated media having a G60<60, represented graphically with box 357.

In another embodiment (dash-dot), the job type is product type 370. The processor selects the first job mode (aGCR) for product types including premium consumer photos (e.g., 3.5"×5", 4"×6", 5"×7", 8"×10", and passport or other identification-document photos), represented graphically with box 375. The processor selects the second job mode (inverse masking) for product types represented graphically with box 377. Such product types can include photobooks, greeting cards, calendars, posters, brochures, postcards, and identification documents (e.g., passports, driver's licenses, or pilot's licenses, for which the clear toner advantageously provides increased durability and resistance to modification).

In various embodiments, aggressive (70-90%) GCR is used in the first job mode. In various embodiments, clear toner is applied in the second job mode to produce an even stack height across the whole print or designated areas of the print (e.g., those containing photographs to be printed with a glossy appearance). These embodiments can be particularly useful for embodiments in which the job type is a media type. The clear toner particles can have the same range of diameters as the colored toner particles (e.g., CMYKLk), or a different range or different diameters. The clear toner particles can be larger than the colored toner particles.

In various embodiments, the six separations correspond to cyan, magenta, yellow, black, light black, and clear colorants. Five of the six separations are non-empty, i.e., either the Lk or clear separation is empty for any given job. The reflection density of black toner can be from 1.6 to 1.9, preferably 1.7, at 100% coverage. The reflection density of the light black can be from 0.4 to 0.9, preferably 0.6, at 100% coverage.

In another embodiment, there are three job modes. The processor selects a first, a second, or a third job mode based on the job type, wherein the first job mode indicates aggressive gray component replacement (aGCR) is used but not clear toner, the second job mode indicates clear toner is used but not aGCR, and the third job mode indicates neither aGCR nor clear toner is used. For example, the third job mode can be used for black-and-white text documents (product type 370), or for documents printed on newsprint (paper type 350).

In the first job mode, the clear separation is empty. In the second job mode, the Lk separation is empty. In the third job mode, the clear and Lk separations are empty.

In the second job mode, aggressive GCR is not used. Therefore, the normal black toners are not applied in flesh tones and light colors, leaving those colors vivid, pure, and pleasant to a viewer due to the absence of black spots that can produce a dirty appearance. However, the micro contrasts of colorants for the chromatic toners (especially C and M) are still high. When clear toner is applied on top of flesh colors, it will smooth out the flesh-tone and light-color reproduction.

In the first job mode, in contrast, aggressive GCR is used (e.g., on high-gloss media). Therefore, a large amount of black toner is used to replace CMY toners in the highlight to midtone areas of image. To improve image quality, light black toners are used instead of normal black toners in these highlight and midtone areas of the job. Using light black toner reduces visual response to the micro contrasts of the color toners (especially C, M) and results in visually-smooth color appearance in the highlight and midtone areas of image.

Figure 4:
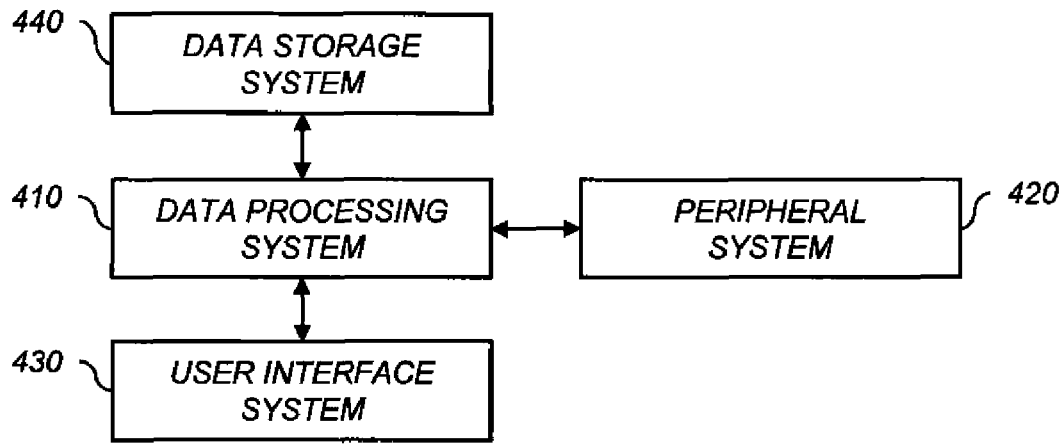
FIG. 4 is a high-level diagram showing the components of a processing system useful with various embodiments.

FIG. 4 is a high-level diagram showing the components of a processing system useful with various embodiments. The system includes a data processing system 410, a peripheral system 420, a user interface system 430, and a data storage system 440. Peripheral system 420, user interface system 430 and data storage system 440 are communicatively connected to data processing system 410.

Data processing system 410 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 440 includes one or more processor-accessible memories configured to store information, including the information needed to execute the processes of the various embodiments of the present invention, including the example processes described herein. Data storage system 440 can be a distributed processor-accessible memory system including multiple processor-accessible memories communicatively connected to data processing system 410 via a plurality of computers or devices. On the other hand, data storage system 440 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 440 is shown separately from data processing system 410, one skilled in the art will appreciate that data storage system 440 can be stored completely or partially within data processing system 410. Further in this regard, although peripheral system 420 and user interface system 430 are shown separately from data processing system 410, one skilled in the art will appreciate that one or both of such systems can be stored completely or partially within data processing system 410.

Peripheral system 420 can include one or more devices configured to provide digital content records to data processing system 410. For example, peripheral system 420 can include digital still cameras, digital video cameras, cellular phones, or other data processors. Data processing system 410, upon receipt of digital content records from a device in peripheral system 420, can store such digital content records in data storage system 440. Peripheral system 420 can also include a printer interface for causing a printer to produce output corresponding to digital content records stored in data storage system 440 or produced by data processing system 410.

User interface system 430 can include a mouse, a keyboard, another computer, or any device or combination of devices from which data is input to data processing system 410. In this regard, although peripheral system 420 is shown separately from user interface system 430, peripheral system 420 can be included as part of user interface system 430.

User interface system 430 also can include a display device, a processor-accessible memory, or any device or combination of devices to which data is output by data processing system 410. In this regard, if user interface system 430 includes a processor-accessible memory, such memory can be part of data storage system 440 even though user interface system 430 and data storage system 440 are shown separately in FIG. 1.

Figure 5:
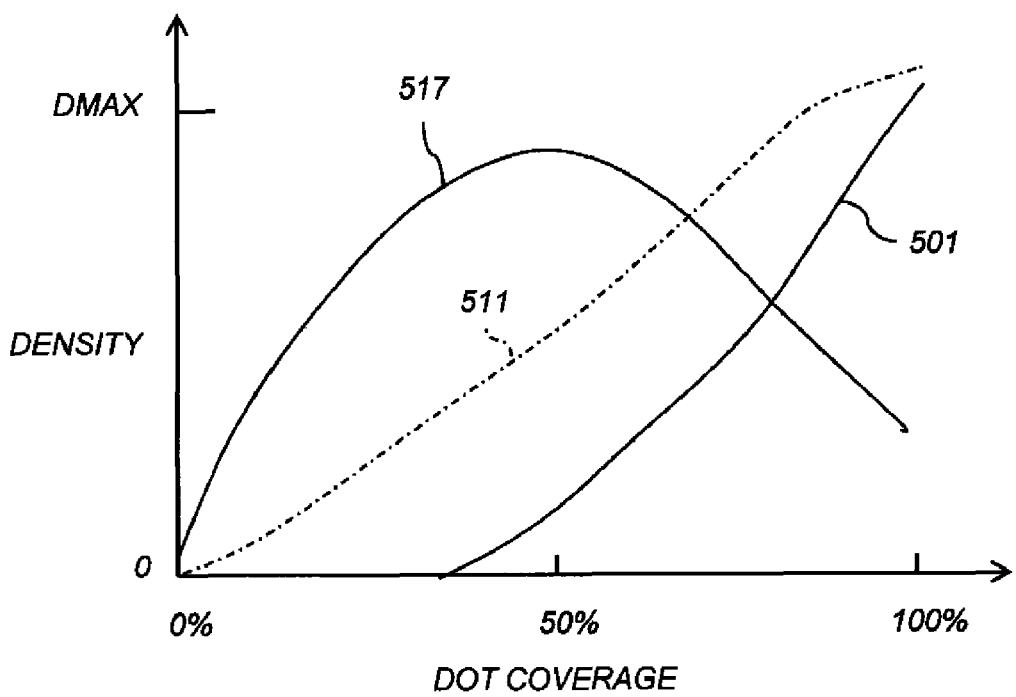
FIG. 5 is an example of a tone curve using normal black and light black.

FIG. 5 is an example of a tone curve using normal black and light black. The abscissa is dot coverage, from 0% to 100%, and the ordinate is the corresponding density, 0 to $D_{MAX}$. Curve 501 is a curve for normal black toners.

Curve 517 is a curve for light black toners. Curve 511 is a blended combination of curves 501 and 517. Curve 511 provides much more discrimination between close densities in the highlight and upper mid-tone regions (coverage<~40%) than curve 501. Curve 511 also maintains detail in the shadow regions (coverage>~60%) than curve 517. This shows the advantages of using normal black (curve 501) and light black (curve 517) toners together.

Figure 7:
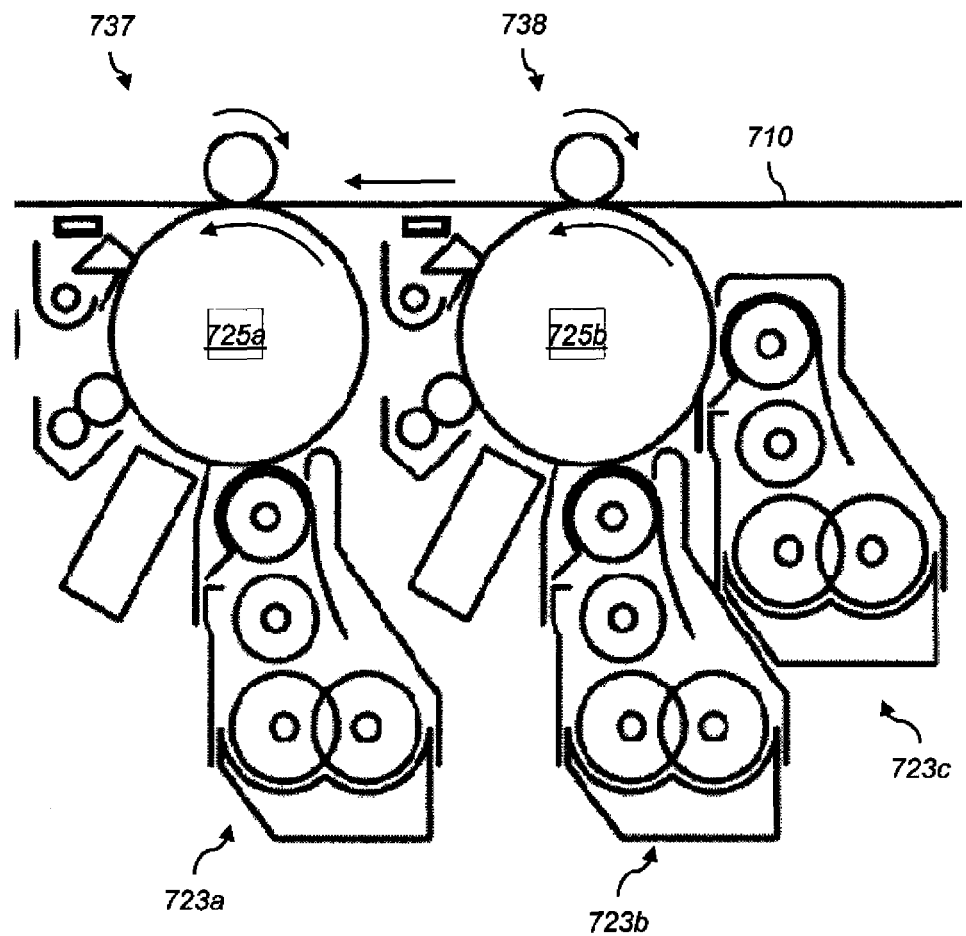
FIG. 7 shows a portion of a printer according to an embodiment.

FIG. 7 shows an embodiment of a portion of a printer according to an embodiment. Intermediate web 710 holds the separations in register for transfer to a receiver. Printing module 737 has drum photoreceptor 725a and toning station 723a. Printing module 738 has photoreceptor 725b and toning stations 723b and 723c, each including a respective color of toner. For example, toning station 723b can hold Lk toner, and toning station 723c can hold clear toner (or vice versa). This is an example of an embodiment in which one of the EP printing modules includes two toning stations, one for applying light black toner and one for applying clear toner. The printer can have any number of photoconductors arranged to deposit toner on web 710 (e.g., one, four, five, six, or more than six), and each photoreceptor can have associated with it one, two, or more toning stations.

In printing module 738, either toning station 723b, 723c deposits toner onto a given latent image on photoreceptor 725b. Only one of the toning stations 723b, 723c deposits toner onto the primary imaging member during a single pass of a receiver through the EP engine.

Toner from toning station 723b is therefore deposited on one pass of web 710, and toner from toning station 723c on another pass of web 710. In this way, multicolor images can be formed in register on web 710 (or directly on a receiver) using fewer photoconductors than colors of toner. In an embodiment using Lk toner in toning station 723b and Clear toner in toning station 723c, each job uses toner from only one of the toning stations 723b, 723c, so a job can be printed in one pass of web 710, provided CMYK toners can also be deposited in that pass (e.g., using photoreceptor 725a and three additional photoreceptors, not shown).

Further details of this and related embodiments are found in PCT/US2009/006102 filed Nov. 13, 2009, published as WO2011/59418, the disclosures of which is incorporated herein by reference.

In another embodiment, aggressive GCR is used without Lk toner. This embodiment also permits balancing toner cost depending on job type. It is particularly useful when the cost of a print is set independently of the cost of toner on the print. This embodiment can be useful for producing lower-cost, lower-quality prints, while maintaining similar costs of prints between different job types. Specifically, a job and its type are received, as described above with reference to FIG. 3, and the processor selects the job mode based on the job type. The processor then processes the data of the job according to the selected job mode to provide five separations corresponding to cyan, magenta, yellow, black, and clear toner, respectively. Toner corresponding to the five separations is then applied to the receiver using at least one EP printing module in the EP printer to produce a print image of the job.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32, 33, 34, 35, 36 printing module
38 print image
39 fused image
40 supply unit
42, 42A, 42B receiver
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
200 input pixel levels
205 workflow inputs
210 image-processing path
211, 212 subpath
214 aggressive-GCR unit
215 light-black toner processing unit
216 optional non-aggressive UCR or GCR unit
217 clear-toner processing unit
220 output pixel levels
250 screening unit
260 screened pixel levels
270 print engine
310 receive job and type step
320 select job mode step
330 process job data step
340 apply separations to receiver step
350 media type 355, 357 box
370 product type
375, 377 box
410 data-processing system
420 peripheral system
430 user-interface system
440 data-storage system
501, 511, 517 curve
710 intermediate web
723a, 723b, 723c toning station
725a, 725b photoreceptor
737, 738 printing module

The invention claimed is:

1. A method of printing a job having a type using an electrophotographic (EP) printer, comprising:
   receiving the job and its type;
   automatically selecting, using a processor, a first or a second job mode based on the job type, wherein the first job mode indicates aggressive gray component replacement (aGCR) is used but not clear toner, and the second job mode indicates clear toner is used but not aGCR;
   processing the data of the job using the processor according to the selected job mode to provide six separations corresponding to respective colorants; and
   applying toner corresponding to the six separations to the receiver using at least one EP printing module in the EP printer to produce a print image of the job.

2. The method according to claim 1, wherein three of the separations correspond to clear, black, and light black toners.

3. The method according to claim 2, wherein the job includes colors and wherein the processing in the first job mode includes:
   determining a black density for each color; and
   rendering some of the black density in each color in the black separation and some in the light black separation.

4. The method according to claim 1, wherein the six separations correspond to cyan, magenta, yellow, black, light black, and clear toners.

5. The method according to claim 1, wherein the clear toner has particles of a different size than the other five toners.

6. The method according to claim 1, wherein a reflection density of the black is from 1.6 to 1.9 at 100% coverage, and a reflection density of the light black is from 0.4 to 0.9 at 100% coverage.

7. The method according to claim 1, wherein the job type is a media type, the processor selects the first job mode for media having a G60 gloss greater than or equal to 60, and the processor selects the second job mode for media having a G60 gloss less than 60.

8. The method according to claim 1, wherein 70-90% gray component replacement (GCR) is used in the first job mode, and clear toner is applied in the second job mode to produce an even stack height across the whole print or designated areas of the print.

9. The method according to claim 8, wherein the job type is a product type, the processor selects the first job mode for a product type selected from the group consisting of premium consumer photos and identification-document photos, and the processor selects the second job mode for a product type selected from the group consisting of photobooks, greeting cards, calendars, posters, brochures, postcards, and identification documents.

10. The method according to claim 1, wherein the processor provides an empty separation corresponding to light black for jobs in the second job mode.

11. The method according to claim 1, wherein one of the EP printing modules includes two toning stations, one for applying light black toner and one for applying clear toner.

12. A method of printing a job having a type using an electrophotographic (EP) printer, comprising:
    receiving the job and its type;
    automatically selecting, using a processor, a first, a second, or a third job mode based on the job type, wherein the first job mode indicates aggressive gray component replacement (aGCR) is used but not clear toner, the second job mode indicates clear toner is used but not aGCR, and the third job mode indicates neither aGCR nor clear toner is used;
    processing the data of the job using the processor according to the selected job mode to provide six separations corresponding to respective colorants; and
    applying toner corresponding to the six separations to the receiver using at least one EP printing module in the EP printer to produce a print image of the job.

13. The method according to claim 12, wherein the processor provides an empty separation corresponding to light black for jobs in the second job mode.

14. A method of printing a job having a type using an electrophotographic (EP) printer, comprising:
    receiving the job and its type;
    automatically selecting, using a processor, a first or a second job mode based on the job type, wherein the first job mode indicates aggressive gray component replacement (aGCR) is used but not clear toner, and the second job mode indicates clear toner is used but not aGCR;
    processing the data of the job using the processor according to the selected job mode to provide five separations corresponding to cyan, magenta, yellow, black, and clear toner, respectively; and
    applying toner corresponding to the five separations to the receiver using at least one EP printing module in the EP printer to produce a print image of the job.

* * * * *